(12) United States Patent
Kuo

(10) Patent No.: US 8,472,628 B2
(45) Date of Patent: *Jun. 25, 2013

(54) METHOD OF HANDLING SECURITY KEY CHANGE AND RELATED COMMUNICATION DEVICE

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,770

(22) Filed: Oct. 20, 2011

(65) Prior Publication Data

US 2012/0033815 A1   Feb. 9, 2012

Related U.S. Application Data

(63) Continuation of application No. 12/328,772, filed on Dec. 5, 2008, now Pat. No. 8,045,715.

(60) Provisional application No. 60/992,675, filed on Dec. 5, 2007.

(51) Int. Cl.
*H04L 9/00* (2006.01)
*H04L 9/08* (2006.01)

(52) U.S. Cl.
USPC ............................. 380/272; 380/277; 380/44

(58) Field of Classification Search
None
See application file for complete search history.

(56) References Cited

U.S. PATENT DOCUMENTS

| 7,961,875 | B2* | 6/2011 | Sachs et al. ................. 380/270 |
| 2009/0270098 | A1* | 10/2009 | Gallagher et al. ......... 455/435.1 |
| 2011/0312299 | A1* | 12/2011 | Patil et al. .................... 455/410 |
| 2012/0122517 | A1* | 5/2012 | De Jong et al. ............ 455/552.1 |

OTHER PUBLICATIONS

Da Yu; Wushao Wen; , "Non-access-stratum request attack in E-UTRAN," Computing, Communications and Applications Conference (ComComAp), 2012 , vol., No., pp. 48-53, Jan. 11-13, 2012.*
Wirola (Location standards driving mass market LCS adoption) year 2011.*
Non-access stratum—Wikipedia, printed out year 2012.*
Base transceiver station—Wikipedia, printed out year 2012.*

* cited by examiner

*Primary Examiner* — David Y Jung
(74) *Attorney, Agent, or Firm* — Blue Capital Law Firm, P.C.

(57) ABSTRACT

A method of handling security key change for a user equipment in a wireless communication system includes applying a radio resource control procedure to activate key change, where the radio resource control procedure covers two conditions where the key change is accompanied with an authentication and key agreement run and without an authentication and key agreement run.

16 Claims, 5 Drawing Sheets

METHOD OF HANDLING SECURITY KEY CHANGE AND RELATED COMMUNICATION DEVICE

CROSS-REFERENCE TO RELATED APPLICATIONS

This application is a Continuation of U.S. patent application Ser. No. 12/328,772, filed on Dec. 5, 2008, which claims the benefit of U.S. Provisional Application Ser. No. 60/992,675, filed Dec. 5, 2007, the entire disclosures of which are incorporated herein by reference.

FIELD

The present invention relates to a method and related communication device for a wireless communication system and more particularly, to a method of handling a security key change for a wireless communication system and related communication device.

BACKGROUND

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS (Quality of Service) requirements simultaneously, providing diverse flexible two-way transmission services and better communication quality to reduce transmission interruption rates.

In order to protect user data and signaling information from being intercepted by unauthorized devices, the prior art 3G mobile communications system can trigger ciphering or integrity protection (IP) through a Security Mode Control (SMC) procedure and make sure that data transmission is more secure. The ciphering procedure calculates keystream data through a ciphering algorithm, then the transmitter encrypts plain-text data with the keystream data to generate cipher-text data, and the receiver can decipher the received cipher-text data with keystream data the same as the keystream data used in the transmitter, so as to obtain the plain-text data.

Regarding security of data transfer, the 3rd Generation Partnership Project. 3GPP develops a security architecture specification to provide an Authentication and Key Agreement (AKA) for use between the UE and the core network (CN). With Authentication and Key Agreement, the UE and the CN can authenticate each other and ensure data security and ciphering. That is, a new key set will be allocated to the UE after the AKA is run in a mobile management (MM) layer.

Please refer to FIG. 1. which is a schematic diagram of a key hierarchy for a long term evolution (LTE) in wireless communication system. Based on different security levels, the UE includes a permanent key K. a ciphering key (CK), an integrity key (IK), a base key KASME, a non-access stratum encryption key K(NAS, enc), a non-access stratum integrity K(NAS, int) and a base station level key KeNB. The permanent key K exists in universal subscriber identity module (USIM). CK and IK are used for ciphering and integrity protection in universal mobile telecommunication system (UMTS). The KASME is used between the UE and an access security management entity (ASME). As for a non-access stratum (NAS), K(NAS, enc) and K(NAS, int) are used for encryption and integrity protection of non-access stratum message, respectively. A user plane (UP) key KeNB-UP-enc and radio resource control (RRC) keys KeNB-RRC-int and KeNB-RRC-enc are derived from the KeNB and used for encryption for user plane data, integrity for RRC messages, and encryption for the RRC messages, respectively. The derivative relationship of keys between each level is illustrated in FIG. 1. For example, the KeNB can be derived from the KASME via a particular algorithm and so on. When the UE is operated in a radio resource control connected (RRC_CONNECTED) mode or a LTE_ACTIVE mode, the UE and the eNB derive the UP and RRC keys (i.e. KeNB-UP-enc, KeNB-RRC-int and KeNB-RRC-enc) from the KeNB. When the UE enters an RRC_IDLE or LTE_IDLE mode, the KeNB. KeNB-UP-enc, KeNB-RRC-int, and KeNB-RRC-enc are deleted from the eNB. In addition, as a result of an AKA run in the UE, each key shown in FIG. 1 must be refreshed when a key change is performed following the AKA run.

When the LTE is operated in the RRC_CONNECTED or LTE_ACTIVE mode, the four requirements regarding the change of keys in the eNB are described as follows in order to ensure data security:

(1) If the sequence numbers that have a length of finite bits and used for the UP or RRC ciphering/integrity protection are about to wrap around, the respective keys shall be changed, (2) If a UE has been in LTE_ACTIVE for a long period of time, the keys for UP and RRC ciphering/integrity protection shall be changed, even though the sequence numbers are not close to wrapping-around.

(3) Lifetime of $K_{ASME}$ shall be restricted.

(4) If the UE has performed an inter-RAT handover from UTRAN/GERAN to LTE. all keys shall be updated within seconds.

However, in cases of (1) and (2). the AKA is unnecessary to run to get new keys. Changes of eNB-local UP and RRC keys are sufficient. This can, for example, be achieved by deriving new UP and RRC keys from the existing $K_{eNB}$ in the eNB itself, or by deriving a new $K_{eNB}$ from the existing $K_{ASME}$. In cases of (3) and (4). the whole key hierarchy based on $K_{ASME}$ must be updated based on a new AKA run.

According to the related specifications, the approach for activating the key change in a RRC_CONNECTED or LTE_ACTIVE mode has not been decided yet. One approach could be an intra-cell handover procedure. Regarding the intra-cell handover procedure, the network performs a handover to the same cell which the UE is already in. Only the AS (Access Stratum) keys are refreshed by the intra-cell handover in similarity with an inter-cell handover. The new AS keys are derived from the previous AS keys.

When the LTE is operated in the RRC_CONNECTED or LTE_ACTIVE mode, there are two types of key changes to consider: the key change with the AKA run and the key change without the AKA run. It is not clear in the prior art how the key change should be performed.

SUMMARY

Therefore, the present invention provides a method of handling a security key change and related communication device.

The present invention discloses a method of handling a key change for a UE in a wireless communication system. The method includes using an RRC procedure to activate the key change for a first condition and a second condition. The first condition is a key change with an AKA run. The second condition is a key change without the AKA run.

The present invention further discloses a communication device for performing a key change for a wireless communication system. The communication device includes a processor, and a storage device. The processor is installed in the control circuit, and used for executing a process. The storage device is coupled to the processor, and used for storing a program code for executing the process. The process includes using an RRC procedure to activate the key change for a first condition and a second condition. The first condition is a key change with an AKA run. The second condition is a key change without the AKA run.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
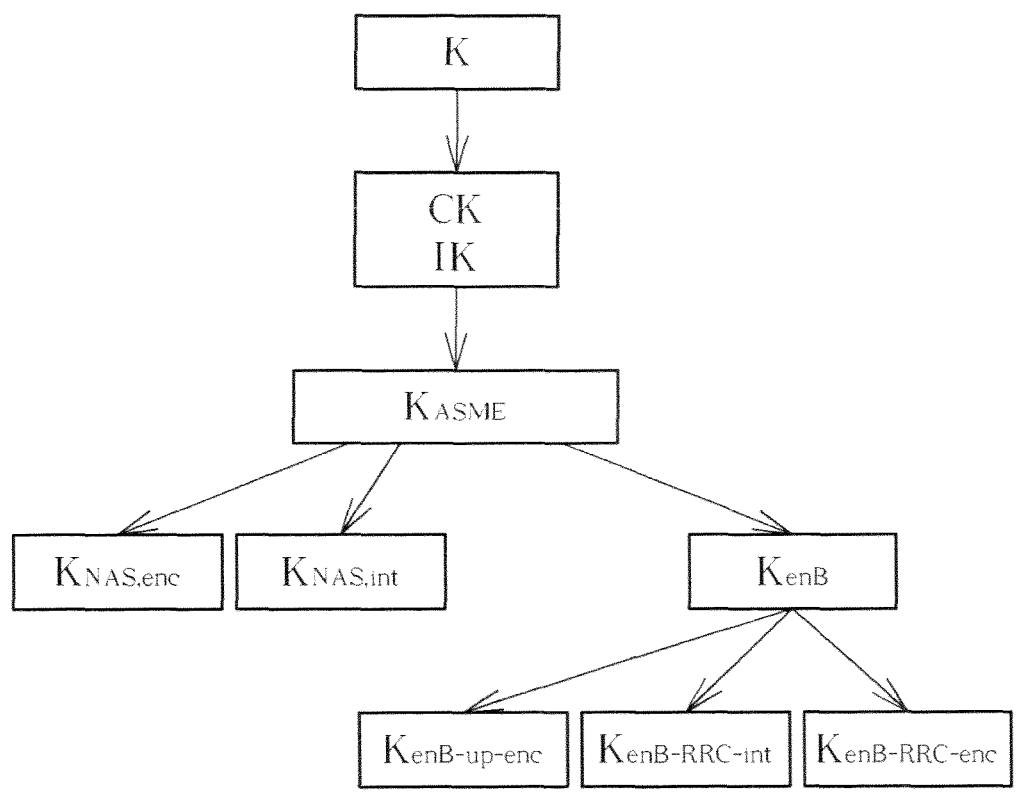
FIG. 1 is a schematic diagram of a key hierarchy for a LTE in wireless communication system.
Figure 2:
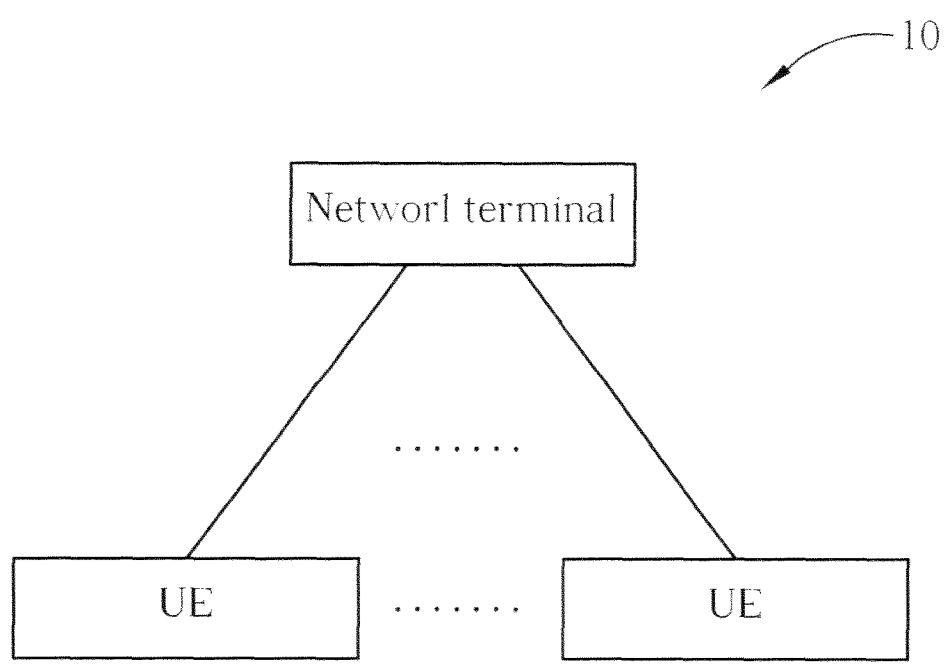
FIG. 2 is a schematic diagram of a wireless communication system

Please refer to FIG. 2, which is a schematic diagram of a wireless communications system 10. The wireless communications system 10 is preferred to be a Long Term Evolution (LTE) communications system, and is briefly formed with a network terminal and a plurality of user equipments. In FIG. 2, the network terminal and the user equipments are simply utilized for illustrating the structure of the wireless communications system 10. Practically, the network terminal may include a plurality of evolved base stations (eNBs), an evolved UMTS radio access network (EUTRAN) and so on according to actual demands, and the user equipments (UEs) can be apparatuses such as mobile phones, computer systems, etc.

Figure 3:
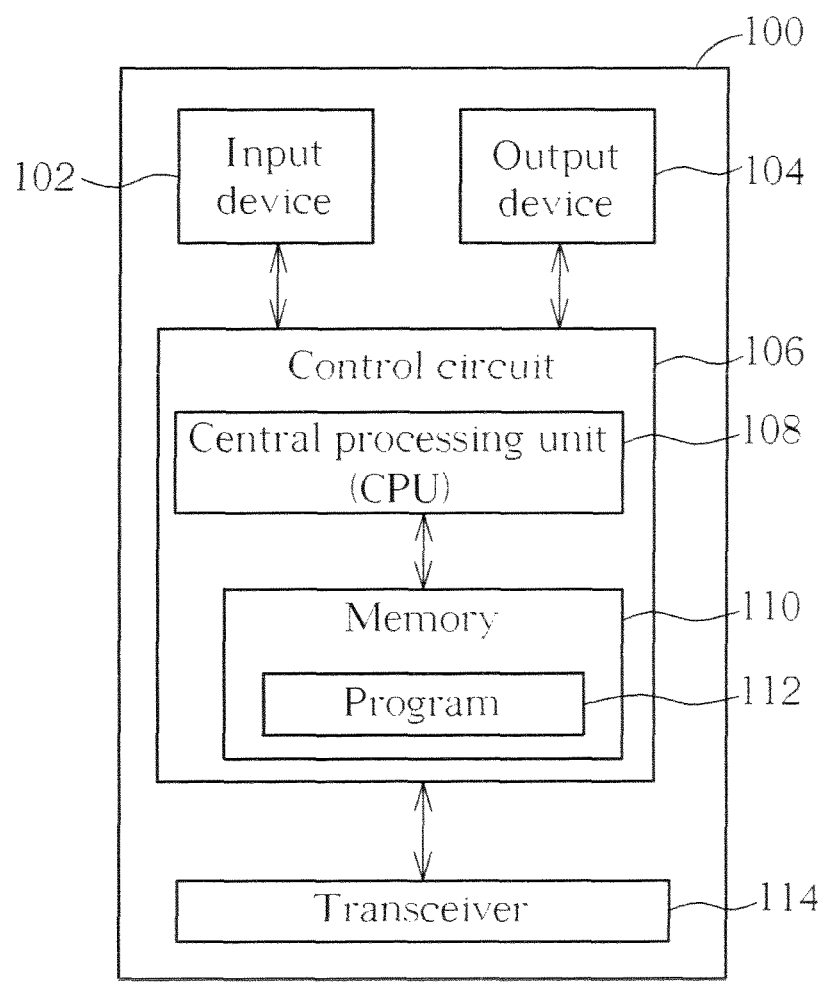
FIG. 3 is a function block of a wireless communication system.

Please refer to FIG. 3, which is a functional block diagram of a communications device 100. The communications device 100 can be utilized for realizing the UES in FIG. 2. For the sake of brevity. FIG. 3 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
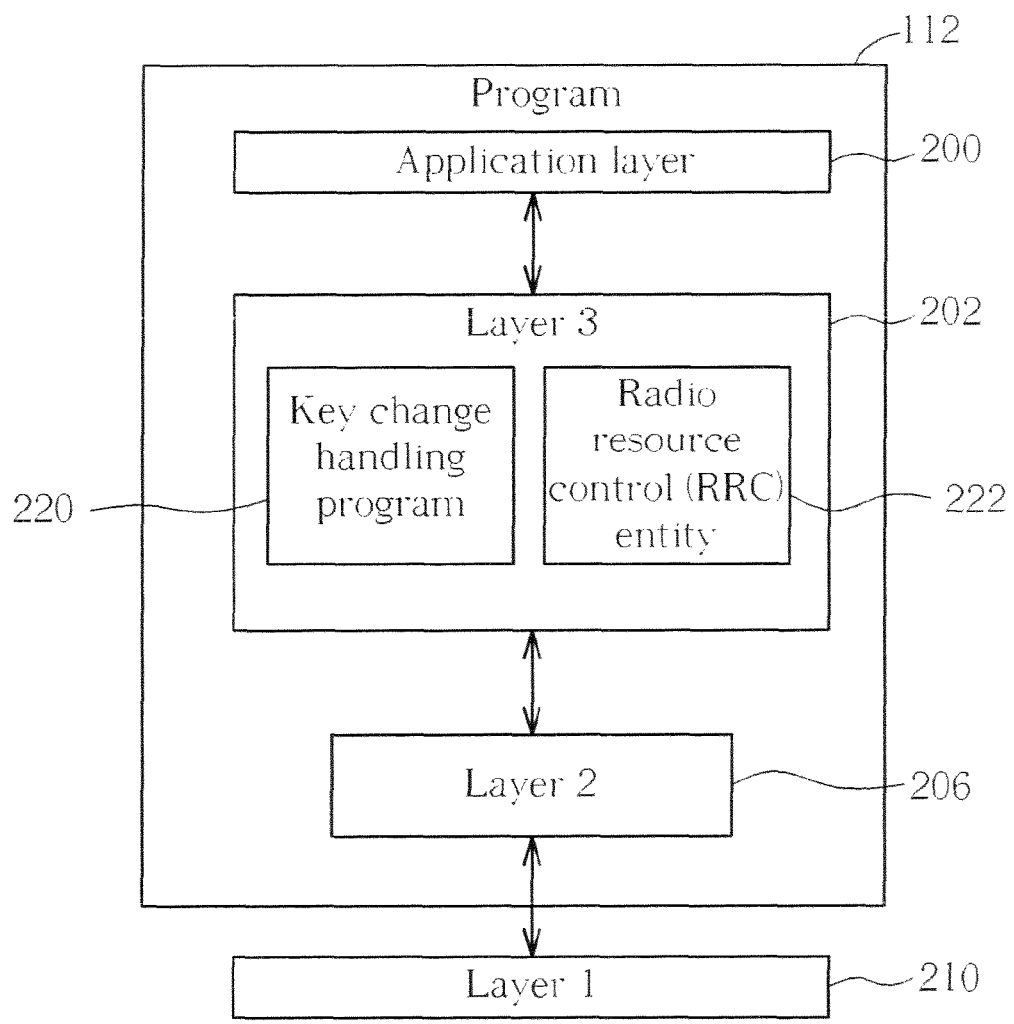
FIG. 4 is a flowchart of a program shown in FIG. 3.

Please continue to refer to FIG. 4, FIG. 4 is a schematic diagram of the program 112 shown in FIG. 3. The program 112 includes an application layer 200. a Layer 3 202, and a Layer 2 206, and is coupled to a Layer 1 208. The Layer 3 202 includes a radio resource control (RRC) entity 222, which is used for controlling the Layer 1 218 and the layer 2 206 and performing peer-to-peer RRC communication with other communications devices, such as a base station or a Node-B. The RRC entity 222 switches the communication device 100 between a radio resource control idle (RRC_IDLE) mode and a radio resource control connected (RRC_CONNECTED) mode.

Figure 5:
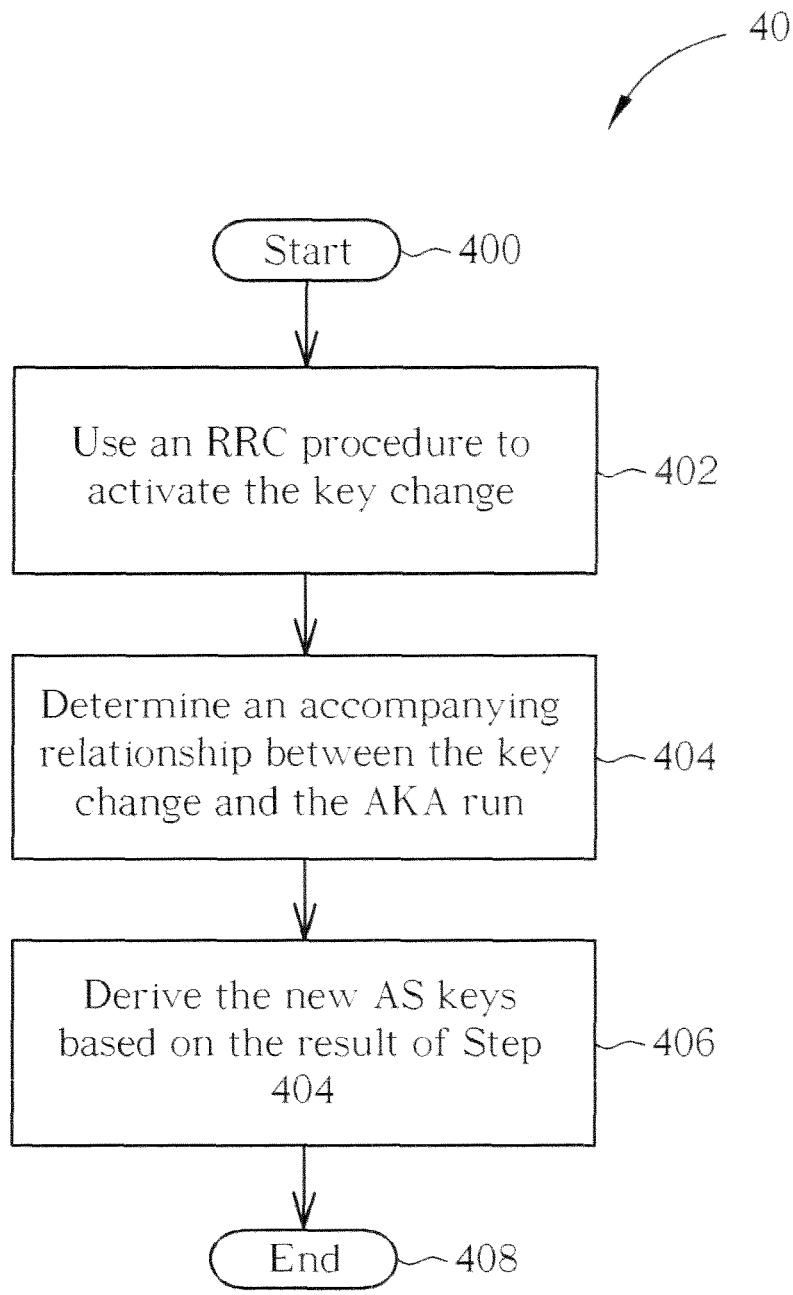
FIG. 5 is a flowchart of a process according to an embodiment of the present invention.

When the communication device 100 is operated in the RRC_CONNECTED mode, a key change handling program 220 is provided in the program 112 according to an embodiment of the present invention and used for determining whether the key change is accompanied with an AKA (Authentication and Key Agreement) run or not. Please refer to FIG. 5, which is a flowchart of a process 40 according to an embodiment of the present invention. The process 40 is used for handling a key change for the UE in a wireless communication system and can be compiled into the key change handling program 220. The process 40 includes the following steps:

Step 400: Start.

Step 402: Use an RRC procedure to activate the key change.

Step 404: Determine an accompanying relationship between the key change and the AKA run.

Step 406: Derive the new AS keys based on the rest of Step 404.

Step 408: End.

According to the process 40, the embodiment of the present invention uses an RRC procedure for activating the key change for following conditions associated with the accompanying relationship between the key change and the AKA run: (1) the key change with the AKA run and (2) the key change without the AKA run.

Preferably, when the UE is operated in the RRC_CONNECTED mode or the LTE_ACTIVE mode. the UE receives an RRC message from the eNB during the RRC procedure. The RRC message includes an indicator for indicating the key change accompanied with the AKA run or not.

An access Stratum (AS) key set, preferably, includes a user plane encryption key $K_{eNB\text{-}UP\text{-}enc}$, an RRC integrity key $K_{eNB\text{-}RRC\text{-}int}$ and an RRC encryption key $K_{eNB\text{-}RRC\text{-}enc}$. The derivative relationship of the aforementioned AS key set can be referred to previous descriptions and not narrated herein. When the indicator indicates that the key change is accompanied with an AKA run, this means that the AKA run was performed earlier than the key change, and thus the UE must derive a new AS key set from the new base key $K_{ASME}$. On the contrary, when the indicator indicates the key change is not accompanied with the AKA run, the new AS key set must be derived from a previous (old) $K_{ASME}$ or $K_{eNB}$. Thus. the UE can determine whether the key change is accompanied with the AKA run or not, and accordingly generates the corresponding new AS key set.

On the other hand. the UE can maintain a status which indicates whether the key set associated with the most recent AKA run has been activated or not. When an AKA run is performed, the status is set to a first value, indicating that a new key set is allocated but has not been activated yet. After the new key set is activated, the status is set to a second value to indicate that the new key set has been activated. For example, the status can be represented by a binary bit. When the binary bit is set to "0", this means that the key set has been activated already. When the binary bit is set to "1", this means that the new key set associated with the most recent AKA run is allocated but has not been activated. After the new key set is activated. the binary bit is reset to "0".

In addition, when the UE in the RRC_CONNECTED mode or the LTE_ACTIVE mode receives the RRC message from the eNB for activating the key change. the UE determines the accompanying relationship between the key change and the AKA run according to the status. When the status is set to the first value, the UE determines the key change with the AKA run. When the status is set to the second value, the UE determines the key change without the AKA run. For example, when the status is set to "0", this means that the key set has been activated already and the new AS key set should be derived from the previous base key K.sub.ASME or K.sub.eNB. When the status is set to "1", this means that the new key set is allocated but has not been activated and the new AS key set should be derived from the new base key K.sub.ASME. After the key change, the status is reset to "0", indicating the new AS key set has been activated.

As known above, the UE can refresh the AS key set by determining whether the key change is accompanied with an AKA run.

To sum up, the embodiment of the present invention uses an RRC procedure for activating the key change and determines whether the key change is accompanied with the AKA. run during the RRC procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a key change for a base station in a wireless communication system, the method comprising:
using a radio resource control (RRC) procedure to activate the key change, wherein an RRC message of the RRC procedure comprises an indicator for indicating whether an Access Stratum (AS) key set is derived from a base ice or a previous base station level key.

2. The method of claim 1, wherein the RRC procedure is a handover procedure.

3. The method of claim 1, wherein the base key is a KASME.

4. The method of claim 1, wherein the AS key set comprises a user plane encryption key, an RRC integrity key, and an RRC encryption key.

5. A communication device for a user equipment (UE) for performing a key change for a wireless communication system, the communication device comprising:
a central processing unit, for executing a process; and
a memory, for storing a program for executing the process, wherein the process comprises;
receiving an RRC message for activating the key change during a RRC procedure, wherein the RRC message comprises an indicator for indicating whether to derive an Access Stratum (AS) key set from a base key or a previous base station level key.

6. The communication device of claim 5, wherein the AS key set comprises a user plane encryption key, an RRC integrity key, and an RRC encryption key.

7. The communication device of claim 5, wherein the RRC procedure is a handover procedure.

8. The method of claim 5, wherein the base key is a KASME.

9. A communication device for a base station for performing a key change for a wireless communication system, the communication device comprising:
a central processing unit, for executing a process; and
a memory, for storing a program for executing the process, wherein the process comprises:
using a radio resource control (RRC) procedure to activate the key change, wherein an RRC message of the RRC procedure comprises an indicator for indicating whether an Access Stratum (AS) key set is derived from a base key or a previous base station level key.

10. The communication device of claim 6, wherein the RRC procedure is a handover procedure.

11. The method of claim 9, wherein the base key is a KASME.

12. The method of claim 9, wherein the AS key set comprises a user plane encryption key, an RRC integrity key, and an RRC encryption key.

13. A method of handling a key change for a user equipment (UE) in a wireless communication system, the method comprising:
receiving an RRC message for activating the key change during a RRC procedure, wherein the RRC message comprises an indicator for indicating whether to derive an Access Stratum (AS) key set from a base key or a previous base station level key.

14. The method of claim 13,
wherein the AS key set comprises a user plane encryption key, an RRC integrity key, and an RRC encryption key.

15. The method of claim 13, wherein the RRC procedure is a handover procedure.

16. The method of claim 13, wherein the base key is a KASME.

* * * * *